3,254,031
BORATE GLASS FOR LASER USE

Paul F. De Paolis and Paul B. Mauer, Rochester, N.Y., assignors to Eastman Kodak Company, Rochester, N.Y., a corporation of New Jersey
No Drawing. Filed June 27, 1962, Ser. No. 205,540
3 Claims. (Cl. 252—301.4)

This invention relates to laser materials of improved efficiency, laser referring to light amplification by stimulated emission of radiation.

The laser action of certain materials has been noted, and the reports of the use of the intense energy contained in the beam of light from a laser have been given. For example, see A. L. Schwalow and C. H. Townes, Phys. Rev., 112, 1940 (1958); E. Snitzer, "Optical Maser Action in Barium Crown Glass," Phys. Rev., Letters, vol. 7, #12, Dec. 13, 1961, p. 444; The Wall Street Journal, Friday, April 13, 1962, p. 14; and Time, April 20, 1962, p. 103.

Cross reference is made to our cofiled application S.N. 205,539 on phosphate lasers.

We have found that by means of certain novel compositions, laser materials of improved efficiency are obtained. For example, the threshold value at which materials according to the present invention begin to exhibit negative absorption and thus initiate laser action is lower than with materials previously known, even though our materials fluoresce with an efficiency no greater than other known materials. In other words, although fluorescence is an integral part of lasing, increased lasing does not depend solely on increased fluorescence.

It is a primary object of our invention to provide improved laser materials and particularly laser materials having a lower threshold value and/or greater efficiency. It is also an object of the present invention to produce a glass which is easy to manufacture, mold and polish to form a laser. In this latter connection, the preferred embodiment of the invention is superior to lasers containing only La, Ba and B oxides plus the sensitizing impurity. According to the present invention, thorium oxide in substantial amounts (10 to 30% of the total by weight) is included in a batch containing 30 to 40% boric oxide, 30 to 50% lanthanum oxide plus barium oxide and .1 to 10% (preferably .3 to 3%) of neodymium oxide, which batch is mixed and fused to make a glass. The boric oxide for convenience is usually introduced in the form of boric acid.

Example 1

Various embodiments of the invention start with a batch as follows:

|  | Percent by wt. |
|---|---|
| $La_2O_3$ | 22.1 |
| BaO | 20.4 |
| ThO | 20.1 |
| $B_2O_3$ | 37.4 |
|  | 100.0 | to which is added $Nd_2O_3$ in various amounts between 0.1 and 10% of the weight of the above base, which batch is then fused as a glass. These are excellent lasers.

Example 2

Similarly other examples of the invention start with a batch as follows:

|  | Percent by wt. |
|---|---|
| $La_2O_3$ | 21.6 |
| BaO | 13.3 |
| $ThO_2$ | 19.7 |
| $B_2O_3$ | 36.7 |
| SrO | 6.3 |
| $SiO_2$ | 2.4 |
|  | 100.0 | to which is added $Nd_2O_3$ in amounts between 0.1 and 10% of base which batch is then fused to form a glass.

The fine optical homogeneity of these materials and their ease of fabrication into rods renders them particularly desirable for laser use. A typical laser rod is approximately ¼" in diameter and 2" long, with polished semi-reflecting ends which are usually flat and parallel, but which in some lasers are curved.

The invention has been described in detail with particular reference to preferred embodiments thereof, but it will be understood that variations and modifications can be effected within the spirit and scope of the invention as described hereinabove and as defined in the appended claims.

We claim:

1. An article for use in a laser comprising a laser rod whose length is greater than its diameter, which has polished ends and which is a glass formed by fusion of a batch consisting essentially of at least substantial amounts of each of $La_2O_3$, BaO, $ThO_2$, $B_2O_3$ and $Nd_2O_3$, the $LaO_2$ and BaO totaling 30% to 50% by weight, the $ThO_2$ being between 10% and 30% by weight, the $B_2O_3$ being between 30% and 40% by weight and the $Nd_2O_3$ between 0.1% and 10% by weight.

2. An article for use in a laser comprising a laser rod whose length is greater than its diameter, which has polished ends and which is of a material consisting essentially of glass formed by fusion of a batch containing sensitizer and a base having substantially the following composition:

|  | Percent by wt. |
|---|---|
| $La_2O_5$ | 22 |
| BaO | 21 |
| $ThO_3$ | 20 |
| $B_2O_3$ | 37 | to which, as the sensitizer, has been added $Nd_2O_3$ in an amount between 0.1 and 10% of the weight of the base.

3. An article for use in a laser comprising a laser rod whose length is greater than its diameter, which has polished ends and which is of a material consisting essentially of glass formed by fusion of a batch containing sensitizer and a base having substantially the following composition:

|  | Percent by wt. |
|---|---|
| $La_2O_3$ | 22 |
| BaO | 13 |
| $ThO_2$ | 20 |
| $B_2O_3$ | 37 |
| SrO | 6 |
| $SiO_2$ | 2 | to which, the sensitizer, has been added $Nd_2O_3$ in an amount between 0.1 and 10% of the weight of the base.

References Cited by the Examiner

UNITED STATES PATENTS

| | | | |
|---|---|---|---|
| 2,116,633 | 5/1938 | Long | 106—47 |
| 2,434,146 | 1/1948 | De Paolis | 106—47 |
| 3,082,101 | 3/1962 | Geffcken et al. | 106—47 |

FOREIGN PATENTS

| | | |
|---|---|---|
| 338,334 | 11/1930 | Great Britain. |
| 412,110 | 6/1934 | Great Britain. |

OTHER REFERENCES

Pringsheim, "Fluorescene and Phosphorescence," published 1949 by Interscience Publishers, New York city (pages 474–478).

Snitzer, "Optical Maser Action in Barium Crown Glass," Phys. Rev. Letters, volume 7, December 13, 1961 (page 444).

TOBIAS E. LEVOW, *Primary Examiner.*

H. McCARTHY, *Assistant Examiner.*